W. M. DALLMAN.
Bail and Ear.

No. 206,543. Patented July 30, 1878.

WITNESSES
C. W. Smith
T. D. Brewster

INVENTOR.
Walter M. Dallman

UNITED STATES PATENT OFFICE.

WALTER M. DALLMAN, OF SYRACUSE, NEW YORK.

IMPROVEMENT IN BAIL AND EAR.

Specification forming part of Letters Patent No. 206,543, dated July 30, 1878; application filed July 1, 1878.

*To all whom it may concern:*

Be it known that I, WALTER M. DALLMAN, of Syracuse, Onondaga county, New York, have invented a new and Improved Bail and Ear, of which the following is a full, clear, and exact description, reference being had to the annexed drawings, in which—

Figure 1:
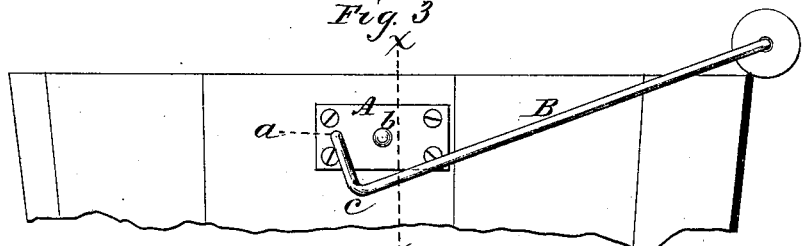
Figure 2:
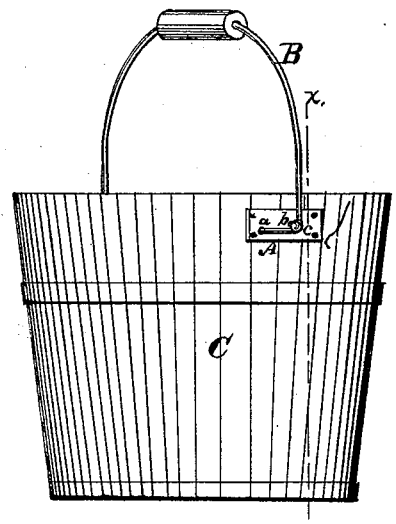

Figure 1 represents a view of the same as applied to an ordinary pail; Fig. 2, a view of the bail and ear upon a larger scale, and Fig. 3 an enlarged view with the bail turned down.

My invention consists in constructing the ears with the usual bail-hole and a projecting pin a short distance therefrom, and in so adjusting the bail, with the ends in the bail-holes under and partially around the pin, that when the ears are properly placed upon the sides of the vessel the weight or strain upon the bail will bear against the pins, and the center of gravity, being a little at one side of the bail, will cause more strain upon the bail where it bears against the pin.

The object of all this is to make the vessel steadier in hand-carriage when filled with liquids.

I construct the bail and ear as follows: I make the ear-piece A of about the shape shown in the drawings, flat upon the back, and curved so as to fit the shape of the vessel, and with the usual bail-hole $a$ therein near one end; or, in lieu of this bail-hole, a projecting spur may be used, around which the ends of the bail can be looped. A short distance therefrom horizontally I place the pin $b$, projecting from the face of the ear-piece A, in which it is securely fastened; or said pin or lug $b$ may be made to project from the side of the vessel independent of an ear-piece, if desired. This pin projects about one-fourth of an inch or so, and is made with or without a knob or square-shaped head, and either projects straight out or is bent more or less downward toward an angle or hook shape, as desired. This ear-piece is then fastened upon or attached to the sides of the vessel, one on each side, opposite to each other, and so located thereon that the outer end of the pin $b$ (calling that part of it the outer end which is farthest away horizontally from the bail-hole or spur) upon each ear-piece will be a little at one side of the center of the vessel.

The bail B is made of wire, bent at each end to hook into the bail-hole $a$, or looped around a spur in the ear-piece A. The bail B is also bent perpendicularly to the hooks or loops upon the ends at the point $c$, as shown in the drawings.

A handle in the usual form is placed upon the bail in the middle. The ends of the bail are hooked into the bail-holes $a$, or looped around a spur, the ear-pieces being attached to the opposite sides of the vessel in any ordinary manner; and when the bail is raised the bends in the bail at $c$ will cause the bail to come up against the under side of the pin $b$, and partially around it.

This pin $b$ is so located upon the side of the vessel or on the ear-piece that the center of gravity, when the ear-pieces are placed thereon, will be to one side of the pin $b$, as shown by the line $x\ x$ in the drawings—that is to say, the pins $b$ should be a little at one side of the center of gravity upon each side of the vessel, and both pins upon the same side of the center.

The object of thus locating the pins is that when the vessel is raised by the bail more than one-half of it is at one side of the bail, which fact causes the bail to press harder against the pin $b$, the pins acting as fulcrums to the lever power of the weight of that part of the vessel, the bail supporting the whole weight of the vessel upon the bend at $c$, so that swinging upon the bail in hand-carriage or otherwise is almost, if not entirely, prevented, and when the vessel is filled the chances of swinging are much less than when empty, and much less danger of spilling or slopping the contents. The heads upon the outer ends of the pins $b$ prevent the bail from slipping off of them.

Having thus described my invention, what I claim as my invention, and desire to secure by Letters Patent, is—

1. The above-described ear-piece A, constructed with bail-hole $a$, or spur, and projecting pin $b$, substantially as above described.

2. The above-described bail B, constructed with a hook or loop at each end, and bent at the point $c$, substantially as and for the purposes above described.

3. The combination of the ear-piece A, constructed with the bail-hole $a$ and projecting pin $b$, and the bail B, hooked or looped at each end and bent upward around and under the pin $b$, with the vessel A, substantially as and for the purposes above set forth.

WALTER M. DALLMAN.

Witnesses:
C. W. SMITH,
T. D. BREWSTER.